US006683706B1

(12) United States Patent
Keithley

(10) Patent No.: US 6,683,706 B1
(45) Date of Patent: Jan. 27, 2004

(54) SYSTEM AND METHOD FOR SCANNING A DOCUMENT

(75) Inventor: Douglas G. Keithley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/437,380

(22) Filed: Nov. 10, 1999

(51) Int. Cl.[7] ............................ H04N 1/46; H04N 1/04; H04N 5/335

(52) U.S. Cl. ........................ 358/514; 358/512; 358/513; 358/445; 358/515; 358/539; 358/486; 348/272; 348/277; 348/283

(58) Field of Search ................................ 358/514, 513, 358/512, 445, 515, 539, 486; 348/272, 277, 283

(56) References Cited

U.S. PATENT DOCUMENTS

| | | | | |
|---|---|---|---|---|
| 4,839,719 A | * | 6/1989 | Hirota et al. | 358/500 |
| 5,541,653 A | * | 7/1996 | Peters et al. | 348/264 |
| 5,901,242 A | * | 5/1999 | Crane et al. | 382/166 |
| 6,344,906 B1 | * | 2/2002 | Gatto et al. | 358/443 |

FOREIGN PATENT DOCUMENTS

| | | |
|---|---|---|
| EP | 0632652 A1 | 1/1995 |
| GB | 2342000 A | 3/1999 |

OTHER PUBLICATIONS

U.K. Patent Office Search Report, May 4, 2001 (1 page).

10–Bit Linear CIS/CCD Sensor Signal Processor with Serial Control, Model No. XRD9829, EXAR Corporation, Fremont, California, Mar. 2, 1998.

3–Channel 10/12–Bit Linear CCD & CIS Sensor Signal Processors, Model No. XRD9810/12, EXAR Corporation, Fremont, California, Aug. 1, 1999.

* cited by examiner

*Primary Examiner*—Edward Coles
*Assistant Examiner*—Houshang Safaipour

(57) ABSTRACT

A system and method are provided to control an acquisition of a number of pixels in a scanning system. In one embodiment, the system includes an interface circuit with a multiplexer to route at least one color component of one of a number of pixels from a sensor to a register. In another embodiment, the system includes at least three registers to receive a color component associated with one of a number of pixels from a sensor, where at least one of the color components is acquired by a multiplexer having a number of inputs. For both embodiments, logic is included that controls the acquisition of various color components, where color components are acquired in random patterns and/or only a predetermined number of the total color components are acquired to reduce an amount of time necessary to scan a document and to eliminate the problem of color artifact.

19 Claims, 11 Drawing Sheets

253

| | a | b | c | d | e | f | g | ... |
|---|---|---|---|---|---|---|---|---|
| 1 | **R** | | | | **R** | | | ... |
| 2 | | R | | R | | | R | ... |
| 3 | | | R | | | R | | ... |
| 4 | R | | | | R | | | ... |
| 5 | | **G**R | | **G**R | | | **G**R | ... |
| 6 | | | GR | | | GR | | ... |
| 7 | GR | | | | GR | | | ... |
| 8 | | GR | | GR | | | GR | ... |
| 9 | | | **B**GR | | | **B**GR | | ... |
| 10 | BGR | | | | BGR | | | ... |
| 11 | | BGR | | BGR | | | BGR | ... |
| 12 | | | BGR | | | BGR | | ... |
| ... | ... | ... | ... | ... | ... | ... | ... | ... |

| | a | b | c | d | e | f | g | ... |
|---|---|---|---|---|---|---|---|---|
| 1 | **R** | | | **R** | | | **R** | ... |
| 2 | | R | | | R | | | ... |
| 3 | | | R | | | R | | ... |
| 4 | | R | | | R | | | ... |
| 5 | **G**R | | | **G**R | | | **G**R | ... |
| 6 | | GR | | | GR | | | ... |
| 7 | | | GR | | | GR | | ... |
| 8 | | GR | | | GR | | | ... |
| 9 | **B**GR | | | **B**GR | | | **B**GR | ... |
| 10 | | BGR | | | BGR | | | ... |
| 11 | | | BGR | | | BGR | | ... |
| 12 | | BGR | | | BGR | | | ... |
| ... | ... | ... | ... | ... | ... | ... | ... | ... |

Figure 12:
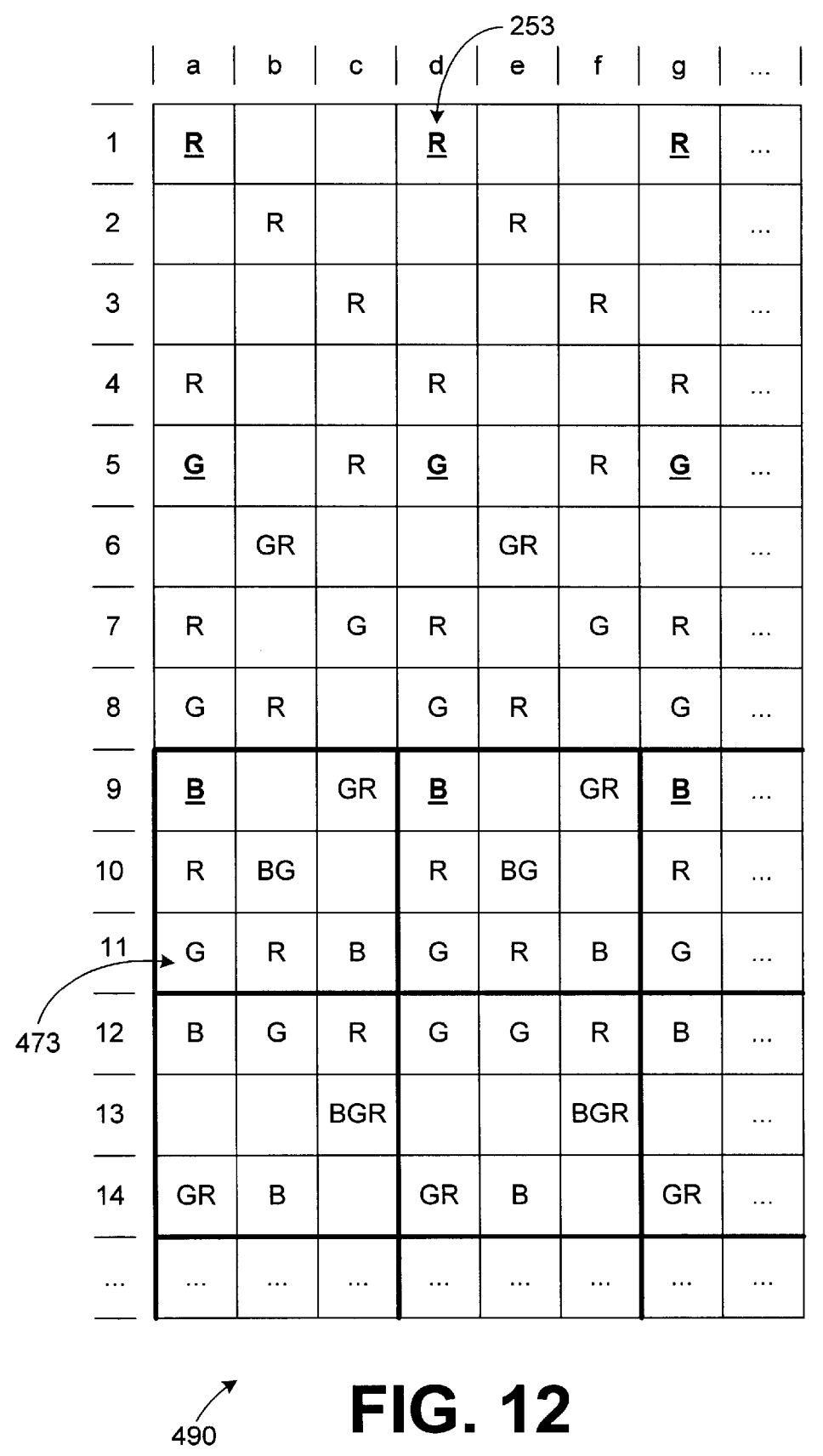

| | a | b | c | d | e | f | g | ... |
|---|---|---|---|---|---|---|---|---|
| 1 | **R** | | | **R** | | | **R** | ... |
| 2 | | R | | | R | | | ... |
| 3 | | | R | | | R | | ... |
| 4 | R | | | R | | | R | ... |
| 5 | **G** | | R | **G** | | R | **G** | ... |
| 6 | | GR | | | GR | | | ... |
| 7 | R | | G | R | | G | R | ... |
| 8 | G | R | | G | R | | G | ... |
| 9 | **B** | | GR | **B** | | GR | **B** | ... |
| 10 | R | BG | | R | BG | | R | ... |
| 11 | G | R | B | G | R | B | G | ... |
| 12 | B | G | R | G | G | R | B | ... |
| 13 | | | BGR | | | BGR | | ... |
| 14 | GR | B | | GR | B | | GR | ... |
| ... | ... | ... | ... | ... | ... | ... | ... | ... |

SYSTEM AND METHOD FOR SCANNING A DOCUMENT

TECHNICAL FIELD

The present invention is generally related to the field of scanning technology and, more particularly, is related to a system and method for scanning documents using charge coupled devices.

BACKGROUND OF THE INVENTION

Current scanning technology now facilitates scanning of color documents and the like to create a digital document therefrom. The digital document or, a hardcopy document reduced to digital form, may then be displayed on an appropriate display device such as a cathode ray tube (CRT), etc. Computer systems provide significant flexibility to users to manipulate or change a digital document in a myriad of ways.

In order to generate the digital document from a hardcopy document, the hardcopy document is typically run through a scanner at a slow speed while the scanner acquires a dense pattern of pixels from the document by sampling values on sensors as they acquire the reflection of white light that strikes the hardcopy document. To acquire full color digital images, each of the pixels is preferably sampled by three sensors, where the reflected light that strikes each of the three sensors is filtered by one of three filters that allows a single color of light to pass therethough. These filters may isolate specific colors, such as, for example, red, green, and blue.

The sensors employed are quite dense, providing a number of pixels of up to 600 per inch and greater. Thus, there is a significant amount of pixel color component data that is created and processed during the scanning of a particular image. Consequently, it takes a significant amount of time to scan and process a specific hardcopy document to obtain a color digital image of the same.

SUMMARY OF THE INVENTION

In light of the foregoing, the present invention provides for a system and method to control an acquisition of a number of pixels in a scanning system. According to one embodiment, the system provides an interface circuit that includes a multiplexer to route at least one color component of one of a number of pixels to a register. The multiplexer comprises at least three color component inputs to receive at least three color components for each of the pixels. The system also includes logic to control a selection signal applied to the multiplexer and a sample signal applied to the register. The selection and sample signals control the acquisition of at least one color component according to a color acquisition sequence.

In another embodiment, the present invention provides a method for acquiring of a number of pixels in a scanning system. Broadly stated, the present method includes the steps of: generating a number of color components associated with a number of pixels of an image; selecting at least one of the color components associated with a respective one of the number of pixels, the selection being made according to a color acquisition sequence; and storing the at least one of the color components selected in a memory.

In still another embodiment, the present invention provides for a system to control an acquisition of a number of pixels in a scanning system. The present system includes at least three registers, each register having an input to receive a color component associated with one of a number of pixels from a charged coupled device (CCD) sensor. Each of the registers includes a sample signal input that receives a sample signal that triggers the acquisition of the color components. The system also includes a multiplexer having a number of inputs, the color component from each of the at least three registers being applied to one of the inputs. The multiplexer also includes a selection input to receive a selection signal. The present system further includes logic to generate the selection signal applied to the selection input and the sample signal applied to the sample signal input. Both the selection signal and the sample signal are generated according to a color acquisition sequence. The color acquisition sequence ultimately causes an acquisition of a number of color components that is less than a total number of color components in an image.

Finally, in yet another embodiment, the present invention provides a method for acquiring of a number of color components associated with a number of pixels of an image in a scanning system. Broadly stated, the present method includes the steps of: generating the number of color components associated with the number of pixels of the image; acquiring all of the color components associated with one of the pixels simultaneously, selecting at least one of the color components acquired simultaneously for each of the pixels; and storing the color components selected in a memory, wherein a total number of color components selected is less than a total number of color components associated with the image.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a drawing of a sampling pattern generated using a nonaligned CCD sensor with the sensor interface circuit of FIG. 2;

FIG. 11 is a drawing of a sampling pattern generated using a nonaligned CCD sensor with the second sensor interface circuit of FIG. 9;

FIG. 12 is a drawing of a random sampling pattern generated using a nonaligned CCD sensor with the second sensor interface circuit of FIG. 9.

DETAILED DESCRIPTION OF THE INVENTION

Figure 1:
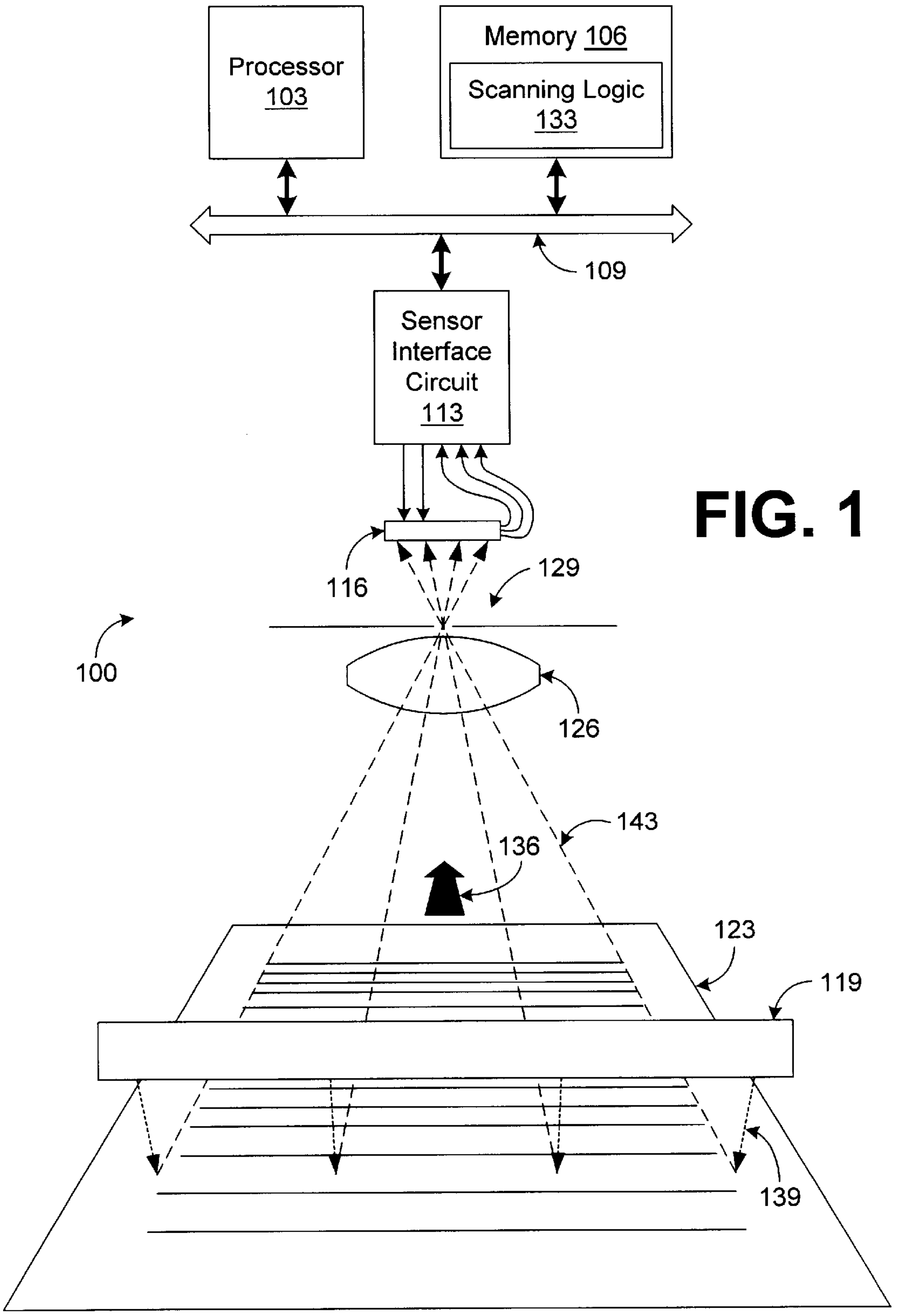
FIG. 1 is a schematic diagram of a scanning system 100 according to an embodiment of the present invention.

With reference to FIG. 1, shown is a scanning system 100 according to an embodiment of the present invention. The scanning system 100 includes a processor 103 and a memory 106 that are electrically coupled to a local interface 109. The local interface 109 may comprise, for example, a data bus and accompanying control bus. A sensor interface circuit 113 is electrically coupled to the local interface 109 and, a charged coupled device (CCD) sensor 116 is, in turn, electrically coupled to the sensor interface circuit 113. The CCD sensor 116 is electrically coupled to the sensor interface circuit 113 via a number of input and output connections.

The scanning system 100 also includes a light source 119 that may comprise, for example a cold cathode fluorescent lamp or other suitable light source. Although not absolutely required, the light source 119 preferably generates incoherent "white" light so that all frequencies of the visible spectrum are generated to as great an extend as is possible. A document 123 or other scan target is shown below the light source 119, The document 123 may comprise any type of document, such as paper, pictures, or other media, etc. The scanning system 100 fuirther comprises a lens 126 and an aperture 129. The scanning system 100 also includes scanning logic 133 stored on the memory 106 and executed by the processor 103.

During the operation of the scanning system 100, the document 123 is fed past the light source 119 in a scan motion 136 at constant speed, the scan motion 136 being initiated by the scanning logic 103. At the same time, the scanning logic 103 also causes the light source 119 to be illuminated and incident light 139 propagates from the light source 119 to the document 123. Reflected light 143 propagates from the document 123 back toward the lens 126. The lens 126 focuses the reflected light 143 through the aperture 129 and onto the CCD sensor 116. The scanning logic 133 generally controls the generation of pixels by the CCD sensor 116 via the sensor interface circuit 113. The pixels are made available to the processor 103 and are stored in the memory 106 as a digital document.

Note that the scan motion 136 is achieved by way of feed apparatus (not shown) involving the use of motors, rollers, and other components. Generally, such feed apparatus are known by those skilled in the art and are not discussed in detail herein. Alternatively, the light source 119 and other components may be moved relative to the document, etc.

Figure 2:
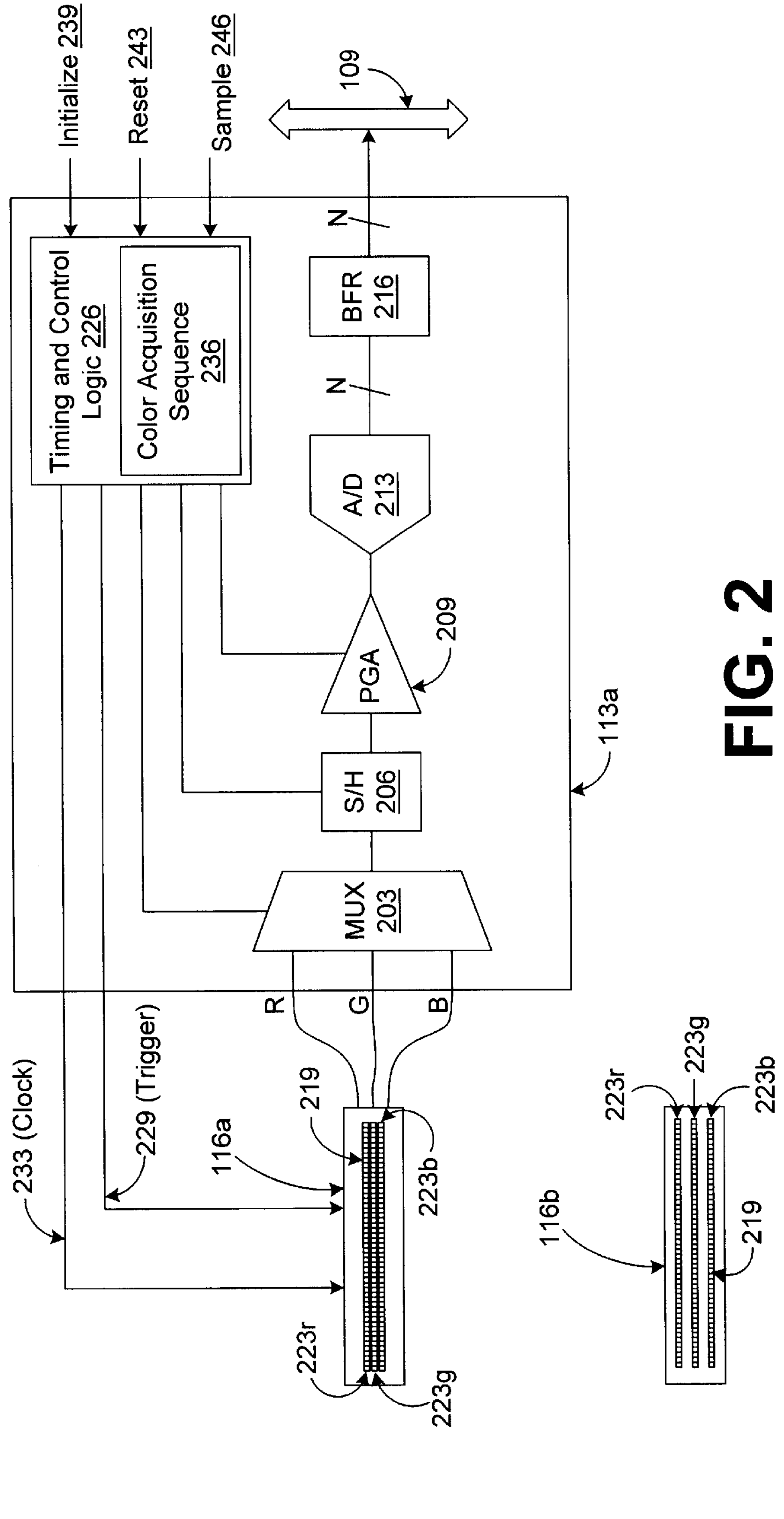
FIG. 2 is a schematic diagram of a charged coupled device (CCD) sensor and a sensor interface circuit employed in the scanning system 100 according to an embodiment of the present invention.

Turning to FIG. 2, shown is a first sensor interface circuit **113*a* and an accompanying aligned CCD sensor 116*a*. Also shown is a nonaligned CCD sensor 116*b* that may be used in place of the aligned CCD sensor 116*a*. The aligned CCD sensor 116*a* has three lines of sensors 219, including a red line 223*r*, a blue line 223*b*, and a green line 223*g*. These three lines of sensors 219 sense the red, blue and green components of a particular line of pixels from the document 123 simultaneously. This is accomplished generally by using optics to distribute the red, green, and blue color components from the single line of pixels from the document 123 (FIG. 1) to the respective red, blue, and green lines 223*r*, 223*g*, and 223*b* of sensors 219**. Note that it may be possible to sense color components other than red, green, and blue, where the red, green, and blue color components are cited as examples of the various color components of pixels that may be obtained according to the principles described herein.

The nonaligned CCD sensor **116*b* also includes the red line 223*r*, blue line 223*b*, and the green line 223*g* oriented as shown. Due to the nonaligned configuration, the red line 223*r*, blue line 223*b*, and the green line 223*g* each sense color components of pixels from three different positions on the document 123 (FIG. 1) at a given instant. The perpendicular distance between the red, blue, and green lines 223*r*, 223*b*, and 223*g* is generally equal to a multiple of the width of the sensors 219 that make up the red, blue and green lines 223*r*, 223*b*, and 223*g***.

There may be various numbers of sensors 219 per inch in the red, blue, and green lines **223*r*, 223*b*, 223*g*** on the order of thousands of sensors per inch. This high density of sensors per inch is accomplished using reduction optics as is known by those skilled in the art. This translates, for example, into the acquisition of hundreds of pixels per inch, although it may be possible to obtain thousands of pixels per inch with sensors of extreme density.

The sensor interface circuit **113*a* includes an input multiplexer 203, a register 206 such as, for example and not limited to, a sample and hold register, a programmable gain amplifier (PGA) 209, an analog-to-digital (A/D) converter 213, and a buffer circuit 216 that are interconnected as shown. The electrical connection between the A/D converter 213 and the buffer 216 comprises a bus having a number of parallel conductors N. Likewise, the buffer 216 is coupled to the local interface 109** via a parallel connection.

The sensor interface circuit **113*a* also includes timing and control logic 226 that is electrically coupled to the CCD sensor 1116*a*/116*b*, the input multiplexer 203, the register 206, and the PGA 209 as shown. The timing and control logic 226 generally controls the operation of the CCD sensor 116*a*/116*b*, register 206, and the PGA 209. In particular, the timing and control logic 226 provides a trigger signal 229 that causes the CCD sensor 116*a*/116*b* to acquire red, blue, and green components of pixels from the document 123 (FIG. 1). A clock signal 233 is also transmitted to the CCD sensor 116*a*/116*b* that controls the flow of the color component information acquired from the sensors 219 into the input multiplexer 203. The timing and control logic 226 also triggers the register 206 to acquire input values from the input multiplexer 203, as well as configuring and controlling the operation of the PGA 209. The timing and control logic 226 also includes a color acquisition sequence 236 to control the operation of the input multiplexer 203**.

The timing and control logic 226 also receives inputs from the processor 103 via the local interface 109. These inputs include an initialization input 239, a reset signal 243, and a sampling signal 246. The initialization input 239 is transmitted at startup and causes the timing and control logic 226 to configure the sensor interface circuit **113*a* for operation. This may include such information as the gain of the PGA 209, etc. The reset signal 243 causes the color acquisition sequence 236 to be placed in a beginning state. Finally, the sampling signal 246 causes the timing and control logic 226 to apply the trigger signal 229 to the CCD sensor 116***a*/116*b* to acquire the red, blue, and green pixels from the document 123.

Next, the operation of the CCD sensor 116*a*/116*b* and the sensor interface circuit 113*a* is described. To begin, the initialization input 239 is downloaded by the processor 103 (FIG. 1) to the timing and control logic 226 that configures the sensor interface circuit 113*a* for operation. The reset signal 243 is applied at various times to the timing and control logic 226 to reset the color acquisition sequence 236. The document 123 is then moved relative to the CCD sensor 116*a*/116*b*, or vice versa. The scanning logic 133 causes the sampling signal 246 to be applied to the timing and control logic 226 at predetermined times during the movement of the document 123. The timing and control logic 226 reacts by applying the trigger signal 229 to the CCD sensor 116*a*/116*b* to acquire the red, blue, and green components of pixels from the document 123.

Once the color components are acquired, the clock signal 233 causes the values associated with the red, blue, and green components of the pixels to be applied in rapid succession from the sensors 219 to the corresponding R, B, and G inputs of the input multiplexer 203. Selected ones of these values are then applied to and acquired by the register 206 via the output of the multiplexer 203. The output of the register 206 is applied to the PGA 209 that, in turn, applies the values to the A/D converter 213. The resulting digitized values are then stored in the buffer 216 where they are accessed by the processor 103 pursuant to the scanning logic 133 and stored as a digital document in an appropriate location in the memory 106.

Given that the density of the sensors 219 can provide resolution of up to, and greater than, 600 ppi, it should be apparent that a significant amount of processing is necessary to acquire and save three different color components for each pixel. Consequently, the speed of the scan motion 136 (FIG. 1) is set relatively slow to provide enough time for the acquisition and storage of the three color components for each pixel from the document 123.

However, in some cases, the higher resolutions are not necessary. For images of lower resolution, the color content of groups of pixels obtained therefrom may be combined to achieve a digital image comprising calculated pixels. The calculated pixels may comprise, for example, nine pixels in one square. Assuming that the color content for each pixel within a particular calculated pixel is relatively uniform, the color information received from parts of the calculated pixel may be generalized for the whole calculated pixel.

Figure 3:
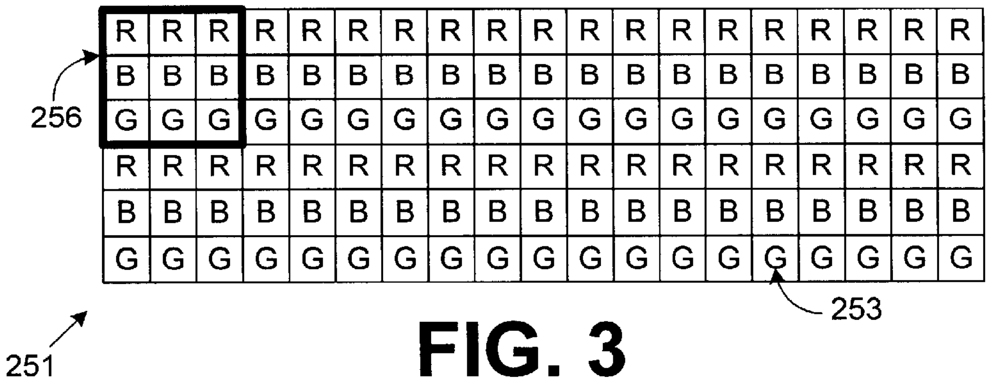
FIG. 3 is a drawing of a linear sampling pattern according to the prior art.

To explain further, reference is made to FIG. 3 that shows a linear sampling pattern 251 of a number of pixels 253 that are generated from the sensors 219 of the CCD sensor 116. Rather than obtain all three colors red, blue, and green for each pixel 253, the image of FIG. 3 shows that only a single color is obtained for each line of pixels 253 in the resulting image. Since only a single color is obtained from each line using the CCD sensor 116, then the document 123 (FIG. 1) may be sped up to three times the speed. A calculated pixel 256 is also shown as combining nine of the pixels 253, where three of the nine are red, three of the nine are blue, and three of the nine are green. To obtain a resulting red, blue and green value for the calculated pixel 256, the reds are averaged to a single red value, the blues are averaged into a single blue value, and the greens are averaged into a single green value. These averaged values are assumed to be the red, blue, and green components of the entire calculated pixel 256. Although a single calculated pixel 256 is shown in FIG. 3, it is understood that there are multiple calculated pixels 256 to generate an image therefrom. Thus, by sampling a single color for each row of pixels 253 on the document 123, the speed at which the document 123 is scanned is sped up significantly. However, the sampling pattern 251 of FIG. 3 which involves sampling a single color for each row is not without its problems as is discussed below with reference to FIG. 4.

Figure 4:
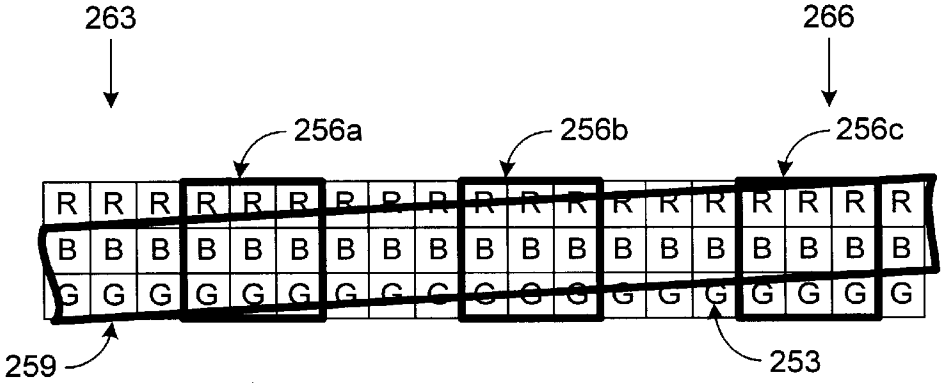
FIG. 4 is a drawing of a linear sampling pattern that illustrates an occurrence of color artifact.

Turning then to FIG. 4, shown are three lines of pixels 253 with calculated pixels 256*a*, 256*b*, and 256*c*. Interposed over the pixels 253 and the calculated pixels 256*a–c* is a solid black line 259 on a white background. The solid black line 259 is shown as transparent for purposes of facilitating the following discussion. The solid black line 259 may appear, for example, on the document 123 that is being scanned. A problem exists, however, because the solid black line 259 is slightly skewed with reference to the horizontal direction. Consequently, on the left side 263 only the blue and green pixels are covered by the solid black line 259. On the right side 266, only the red and blue pixels 253 are covered. Thus, even though the solid black line 259 is in fact black, it will appear as a multitude of colors since the color acquisition was not uniform across its surface. This is known as color artifact to those skilled in the art.

In addition, even if the solid black line 259 is not skewed as shown, it may only cover two of three rows of pixels as shown. Consequently, the solid black line 259 may appear as a solid line of a different color, depending upon the particular one or two rows of pixels that lie within the black line for which color components are acquired.

Figure 5:
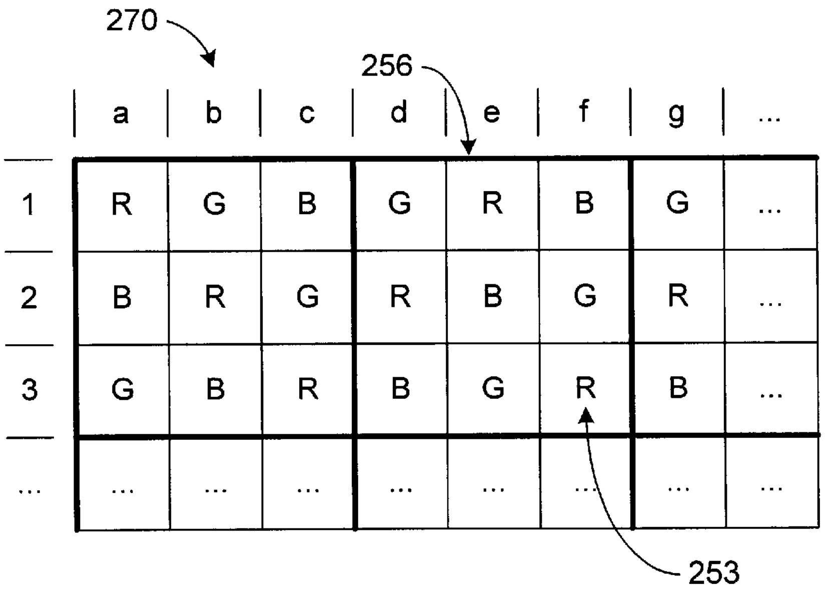
FIG. 5 is a drawing of a random sampling pattern generated using an aligned CCD sensor with the sensor interface circuit of FIG. 2.

Turning to FIG. 5, shown is a sampling pattern 270 that avoids the problem of color artifact according to an embodiment of the present invention. The sampling pattern 270 includes rows that are labeled 1, 2, 3, . . . , and columns are labeled a, b, c, d, e, f, g, . . . as shown. Each of the rows corresponds to a single scan with the sensors 219 (FIG. 2) of the aligned CCD sensor 116*a* from the document 123. For the sampling pattern 270, it is assumed that the aligned CCD sensor 116*a* is an aligned sensor in which all three rows of sensors 223*b*, 223*r*, and 223*g* acquire color components from the same corresponding row of pixels 256 on the document 123 in a given scan. As shown in FIG. 5, the color acquisition sequence 236 (FIG. 2) controls the multiplexer 203 (FIG. 2) to switch between the red, blue, and green inputs from the CCD sensor 116 as the color values for a single row of the document 123 is read into the first sensor interface circuit 113*a* (FIG. 2) from the aligned CCD sensor 116*a*. Thus, each row 1, 2, 3, . . . , of the sampling pattern 270 is generated by randomly selecting among one of the three colors for each pixel received from the aligned CCD sensor 116*a*. This randomization prevents a solid black line 259 (FIG. 4) from being exposed to less than three colors for a particular calculated pixel 256, thereby reducing or eliminating color artifact. The sampling pattern 270 may be obtained, for example, according to the color acquisition sequence 236 below, where the letters R, G and B indicate the color component, and the numbers/lower case letters indicate the position in the sampling pattern 270. The color acquisition sequence 236 is as follows:

| | |
|---|---|
| First scan | R1a, G1b, B1c, G1d, R1e, B1f, G1g, . . . |
| Second scan | B2a, R2b, G2c, R2d, B2e, G2f, R2g, . . . |
| Third scan | G3a, B3b, R3c, B3d, G3e, R3f, B3g, . . . |
| . . . | |

where each scan is performed by applying the trigger signal 229 (FIG. 2) to the aligned CCD sensor 116*a* to cause the sampling of the sensors 219 (FIG. 2).

Figure 6:
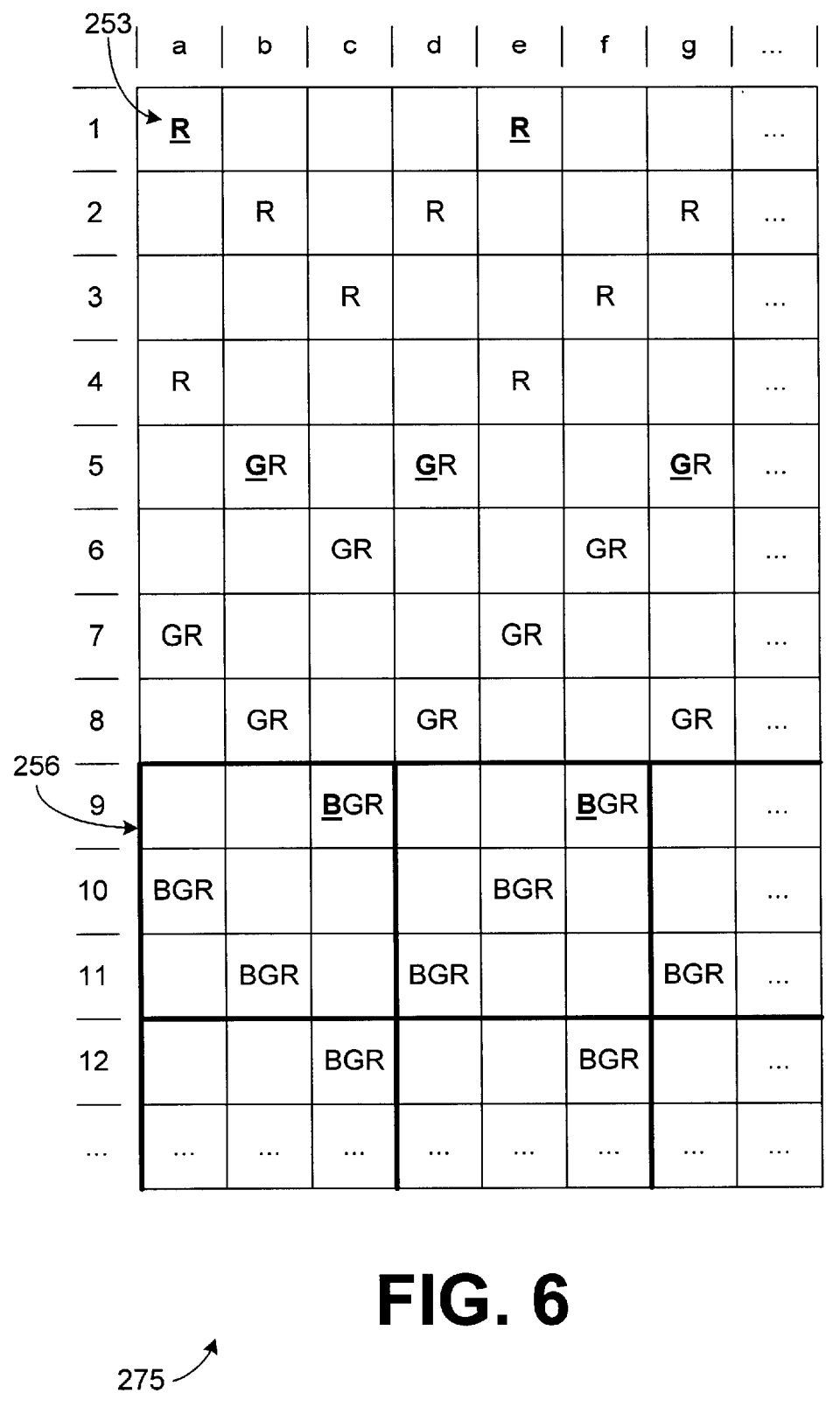

With reference to FIG. 6, shown is a sampling pattern 275 in which the nonaligned CCD sensor 116*b* is employed. Assuming once again that the rows labeled 1, 2, 3, 4 . . . to the left of the sampling pattern 275 indicating scanned lines of pixels 253 that are obtained from the document 123. Due to the fact that the red line 223*r* (FIG. 2), the blue line 223*b* (FIG. 2), and the green line 223*g* (FIG. 2) of the nonaligned sensor 116*b* (FIG. 2) are offset, there are rows of pixels 253 between each of the pixels 253 acquired by the sensors 219 as seen from the sampling pattern 275 of FIG. 6. As shown in the sampling pattern 275, there are three rows of pixels 253 between the red, green, and blue lines 223*r*, 223*g*, 223*b* of the nonaligned sensor 116*b*.

Consequently, the color acquisition pattern 236 (FIG. 2) is determined with the offset lines of sensors 219 in the nonaligned sensor 116*b* in mind to control the selector input of the multiplexer 203 (FIG. 2). A color acquisition sequence 236 is illustrated by the pixels 253 for which a color component is acquired as indicated by the letters R for red, G for green, and B for blue. In the sampling pattern 275, the color components selected from those generated by the nonaligned sensor 116*b* for the first scan across the sensors 219 are indicated by the underlined letters R, G and B. The color acquisition sequence 236 continues with addition scans that cause a random acquisition of color components as shown in the sampling pattern 275. In particular, the color acquisition sequence 236 of the sampling pattern 275 is a follows:

| | |
|---|---|
| First scan | R1a, G5b, B9c, G5d, R1e, B9f, G5g, . . . |
| Second scan | B10a, R2b, G6c, R2d, B10e, G6f, R2g, . . . |
| Third scan | G7a, B11b, R3c, B11d, G7e, R3f, B11g, . . . |
| Fourth scan | R4a, G8b, B12c, G8d, R4e, B12f, G8g, . . . |
| Fifth scan | B13a, R5b, G9c, R5d, B13e, G9f, R5g, . . . |
| Sixth scan | G10a, B14b, R6c, B14d, G10e, R6f, B14g, . . . |
| Seventh scan | R7a, G11b, B15c, G11d, R7e, B15f, G11g, . . . |
| Eighth scan | B16a, R8b, G12c, R8d, B16e, G12f, R8g, . . . |
| Ninth scan | G13a, B17b, R9c, B17d, G13e, R9f, B17g, . . . |
| Tenth scan | R10a, G14b, B18c, G14d, R10e, B18f, G14g, . . . |
| Eleventh scan | B19a, R11b, G15c, R11d, B19e, G15f, R11g, . . . |
| Twelfth scan | G16a, B20b, R12c, B20d, G16e, R12f, B20g, . . . |
| . . . | |

Thus, the sampling pattern 275 does not begin to acquire all three color components of the various pixels sampled until the ninth scan as shown. In order to compensate for the fact that not all of the color information is obtained for scans 1–8, the document 123 may be positioned so that the scans 1–8 are performed beyond the desired image to ensure that the image obtained includes complete color information for red, blue, and green components.

Figure 7:
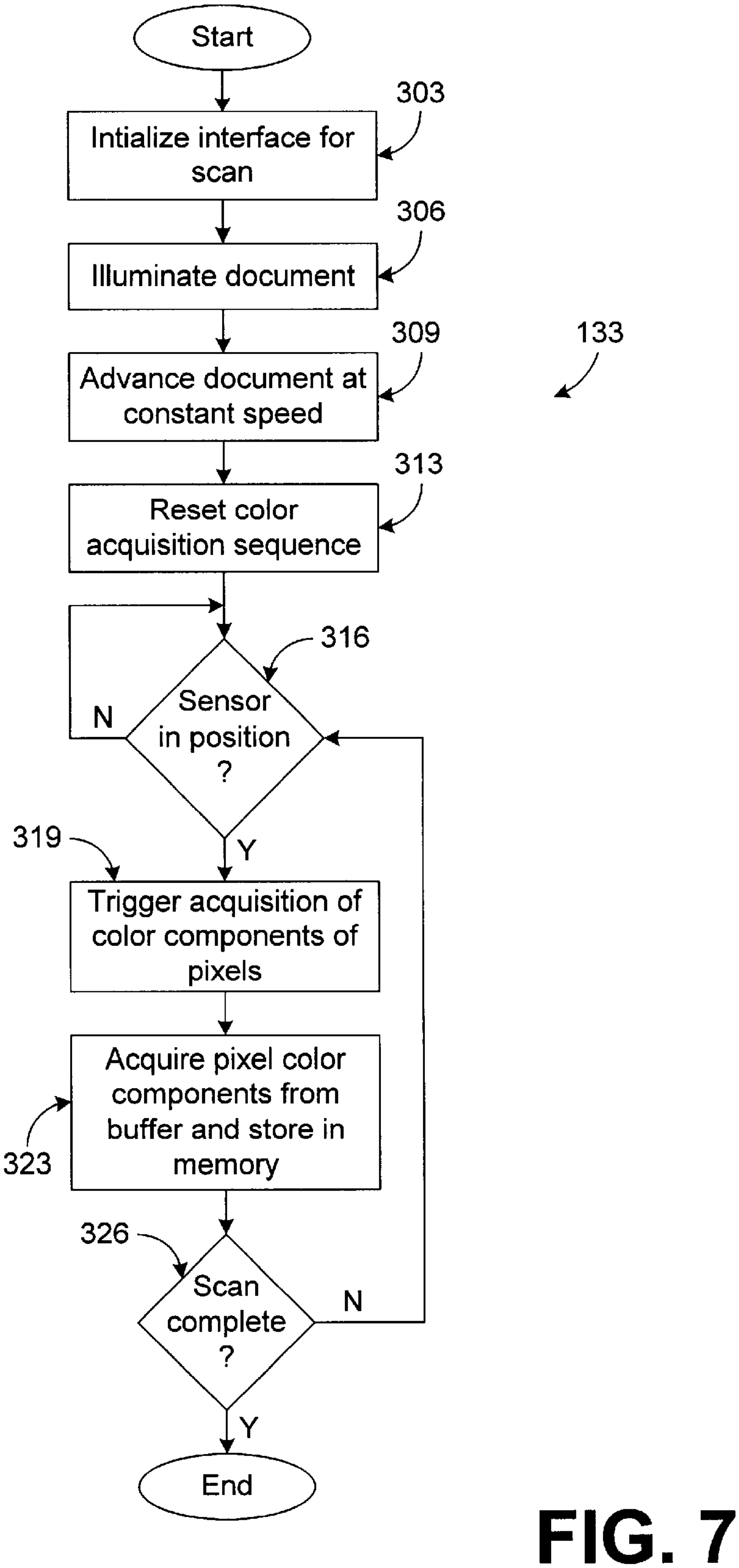
FIG. 7 is a flow chart of sampling logic employed in the scanning system of FIG. 1 with the CCD sensor and sensor interface circuit of FIG. 2.

Turning then to FIG. 7, shown is a flow chart of the scanning logic 133 (FIG. 1) according to another embodiment of the present invention. The scanning logic 133 relates to the control of the sensor interface circuit 113*a* in coordination with the relative motion of the document 123 (FIG. 1) and the other scanner components, as well as the storage of the resulting digital image in the memory 106 (FIG. 1). Beginning with block 303, the sensor interface circuit 113 is initialized by inputting various signals to the initialize input 239, such as a value to configure the programmable gain amplifier, as well as other parameters, etc. Thereafter, in block 306 the light source 119 is illuminated to begin the scan of the entire document 123. Next, the document 123 is advanced at a constant speed relative to the light source 119 and the CCD sensor 116 (FIG. 1).

Following thereafter, in block 313 the reset signal 243 (FIG. 2) is applied to the timing and control logic 226 to reset the color acquisition sequence 236 (FIG. 2) that controls the multiplexer 203 (FIG. 2). Then, in block 316, the scanning logic 133 determines whether the CCD sensor 116*a*/116*b* is in position to acquire the color components of the various pixels from the document 123. If so, then the logic 133 moves on to block 319 in which the CCD sensor 116*a*/116*b* is triggered to acquire the color components of the various pixels on the document 123 that lie in the proper position to be sensed by the sensors 219 (FIG. 2).

Thereafter, in block 323, the logic 133 acquires the pixel color components from the buffer 216 as they are received from the CCD sensor 116*a*/116*b* via the multiplexer 203, the register 206, the programmable gain amplifier 219, the analog-to-digital converter 213 and the buffer 216. The pixel color components acquired are stored in the memory 106 (FIG. 1) where they can be accessed and calculated pixels generated therefrom. The logic 133 then moves to block 326 in which it is determined whether the entire document 123 has been scanned. If further scanning is required, then the logic 133 reverts back to block 316 to wait for the CCD sensor 116*a*/116*b* to arrive in the next scan position. If, in block 326, the scanning of the entire document 123 is complete, then the logic 133 ends.

Note that the acquired pixel color components are stored in the memory 106 according to the color acquisition sequence 236 that is operated in the timing and control logic 226. Thus, further logic may be required to unscramble this data into uniform pixel information to be transmitted to an appropriate display device.

Figure 8:
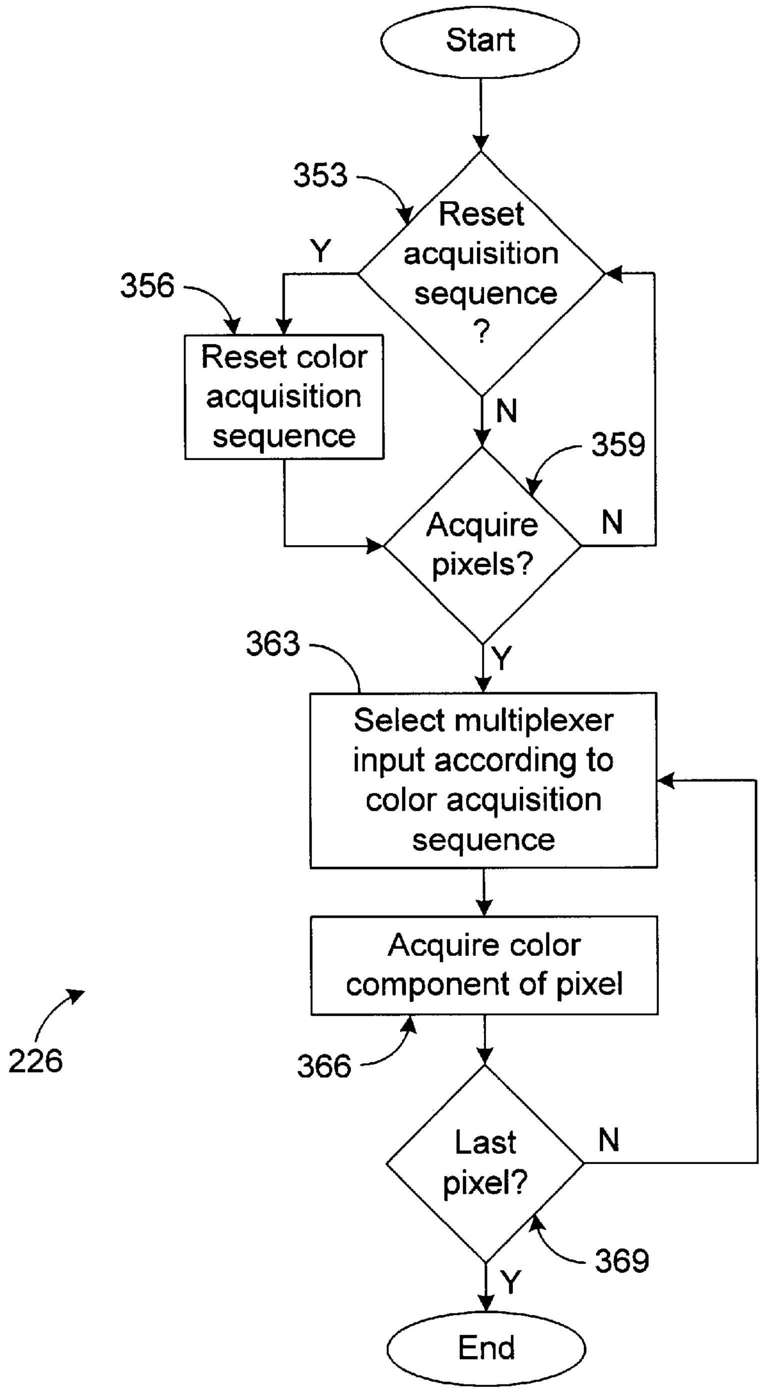
FIG. 8 is a flow chart of an exemplary color acquisition sequence employed in the sensor interface circuit of FIG. 2.

Turning to FIG. 8, shown is a flow chart of the timing and control logic 226 according to another embodiment of the present invention. The timing and control logic 226 specifically controls the operation of the components of the sensor interface circuit 113 a as well as the CCD sensor 116*a*/116*b*. Beginning with block 353, the timing and control logic 226 determines whether the color acquisition sequence 236 (FIG. 2) in the timing and control logic 226 needs to be reset to begin a scan of a document 123 (FIG. 1). Generally, this involves determining whether the reset signal 243 (FIG. 2) has been received from the processor 103 pursuant to the scanning logic 133. If the color acquisition sequence 236 is to be reset, then the logic 226 moves to block 356 in which the color acquisition sequence 236 is reset to a starting position. If, in block 353, the color acquisition sequence 236 is not to be reset because no reset signal 243 is applied to the timing and control logic 226, then the logic 226 moves on to block 359 in which it is determined whether the pixels are to be acquired in a scan with the CCD sensor 116*a*/116*b*. If so, then the logic 226 progresses to block 363. Otherwise, the logic 226 reverts back to block 353.

In block 363 the input to the multiplexer 203 received from the timing and control logic 226 is set to acquire the color component of a particular pixel according to the color acquisition sequence 236. Thereafter, in block 366, the particular color component of the pixel is acquired from the CCD sensor 116*a*/116*b* into the register 206 through the multiplexer 203. The color component acquired by the register 206 is ultimately placed in the buffer 216 (FIG. 2) via the PGA 209 (FIG. 2). Then, in block 369 it is determined whether the last pixel in the current scan with the CCD sensor 116*a*/116*b* has been received by the register 206. If the last pixel has not been acquired, then the logic 226 reverts back to block 363 to acquire the color component of the next pixel. Otherwise, the logic 226 ends as shown.

Figure 9:
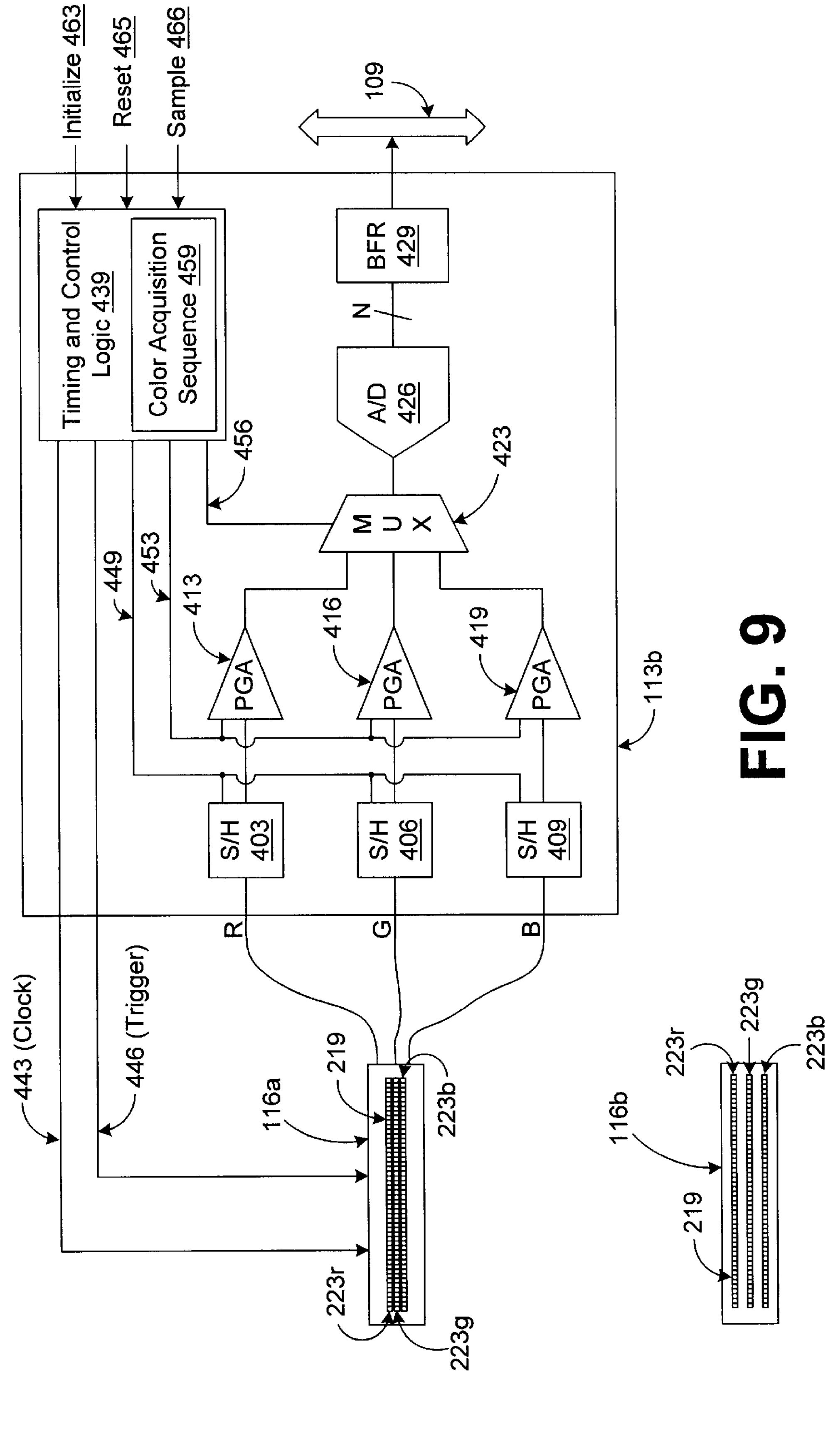
FIG. 9 is a schematic diagram of a charged coupled device (CCD) sensor and a second sensor interface circuit employed in the scanning system 100 according to another embodiment of the present invention.

With reference then to FIG. 9, shown is a second sensor interface circuit 113*b* according to another embodiment of the present invention. The second sensor interface circuit 113*b* includes first, second and third registers 403, 406, and 409, respectively, that may comprise, for example and not limited to, sample and hold registers or other suitable registers. The registers 403, 406, and 409 receive a respective red, green or blue input as shown from the aligned CCD sensor 116*a*. Note, however, that the nonaligned CCD sensor 116*b* may also be employed in the place of the aligned CCD sensor 116*a* as was discussed with reference to the first sensor interface circuit 113*a* (FIG. 2).

The second sensor interface circuit 113*b* also includes a first, second and third programmable gain amplifiers 413, 416, and 419. Each of the programmable gain amplifiers 413, 416, and 419 receive an input from the registers 403, 406 and 409 as shown. The output from the programmable gain amplifiers 413, 416, and 419 is applied to one of three inputs of a multiplexer 423. The output of the multiplexer is applied to an analog to digital converter 426 that, thereafter, applies digital values to a buffer 429. The output of the buffer 429 provides access to the color components from the local interface 109 (FIG. 1).

The second sensor interface circuit 113*b* also includes timing and control logic 439 that provides various control signals to the components of the second sensor interface circuit 113*b*. For example, the timing and control logic 439 provides a clock signal 443 and a trigger signal 446 to the CCD sensor 116*a*/116*b*. The timing and control logic 439 also provides a sample signal 449 to the registers 403, 406, and 409 as well as a gain control signal 453 to the programmable gain amplifiers 413, 416 and 419. Finally, the timing and control logic 439 provides a selection input 456 to the multiplexer 423. The timing and control logic 439 determines the particular state of the selection input 456 and generates the sample signal 449 based upon the color acquisition sequence 459 within the timing and control logic 439. Also note that the timing and control logic 439 receives an initialization input 463, a reset signal 465, and a sampling signal 466 from the local interface 109 as generated by the processor 103 (FIG. 1).

Next, the operation of the second sensor interface circuit 113*b* is described. First, the second sensor interface circuit 113*b* is initialized by the initialization input 463 that provides the operating configuration for the programmable gain amplifiers, etc. The reset signal 465 is applied to cause the color acquisition sequence 459 to be placed in a beginning state to acquire the various color components from the document 123 to be scanned. Then, the document 123 is placed in motion as compared to the sensors 219 and a sampling signal 466 is applied to the timing and control logic 439 that reacts by transmitting the trigger signal 446 to the CCD sensor 116*a*/116*b*. This triggers the sampling of the sensors 219 in a scan from left to right or vice versa, depending upon the particular CCD sensor 116*a*/116*b* employed. For each pixel acquired by the sensors 219, the red, green, and blue components are applied to the sampling and hold registers 403, 406, and 409 as shown.

The red, green, and blue color components of each pixel acquired by the CCD sensor 116*a*/116*b* are applied to the registers 403, 406, and 409 in synchronization with the clock signal 443 that is applied to the CCD sensor 116*a*/116*b*. The selection input 456 to the multiplexer 423 determines which of the red, green or blue values acquired by the sampling and hold registers 403, 406 and 409 is read to the analog-to-digital converter 426. The color acquisition sequence 459 determines which color components are actually applied to the memory 106 by virtue of controlling the selector input 456. Once applied to the analog-to-digital converter, the particular color component is thereafter applied to the buffer 429 which is then accessed by the processor 103 (FIG. 1) via the local interface 109. The color components selected are then stored in the memory 106 (FIG. 1) and thereafter accessed to generate a number of calculated pixels to display the image obtained.

Note that of the three color components, red, green, and blue acquired for each pixel, only one is selected at a particular instant by the multiplexer 423 as determined by the color acquisition sequence 459 to be stored in the memory 106. In some cases, only one of the three color components for a particular pixel is selected and stored in the memory 106. In other cases, two or even all three of the color components for a particular pixel may be selected and stored in the memory 106, depending upon the particular acquisition sequence 459 employed. The color component values stored in the memory 106 may then be generalized for a calculated pixel as will be discussed.

Figure 10:
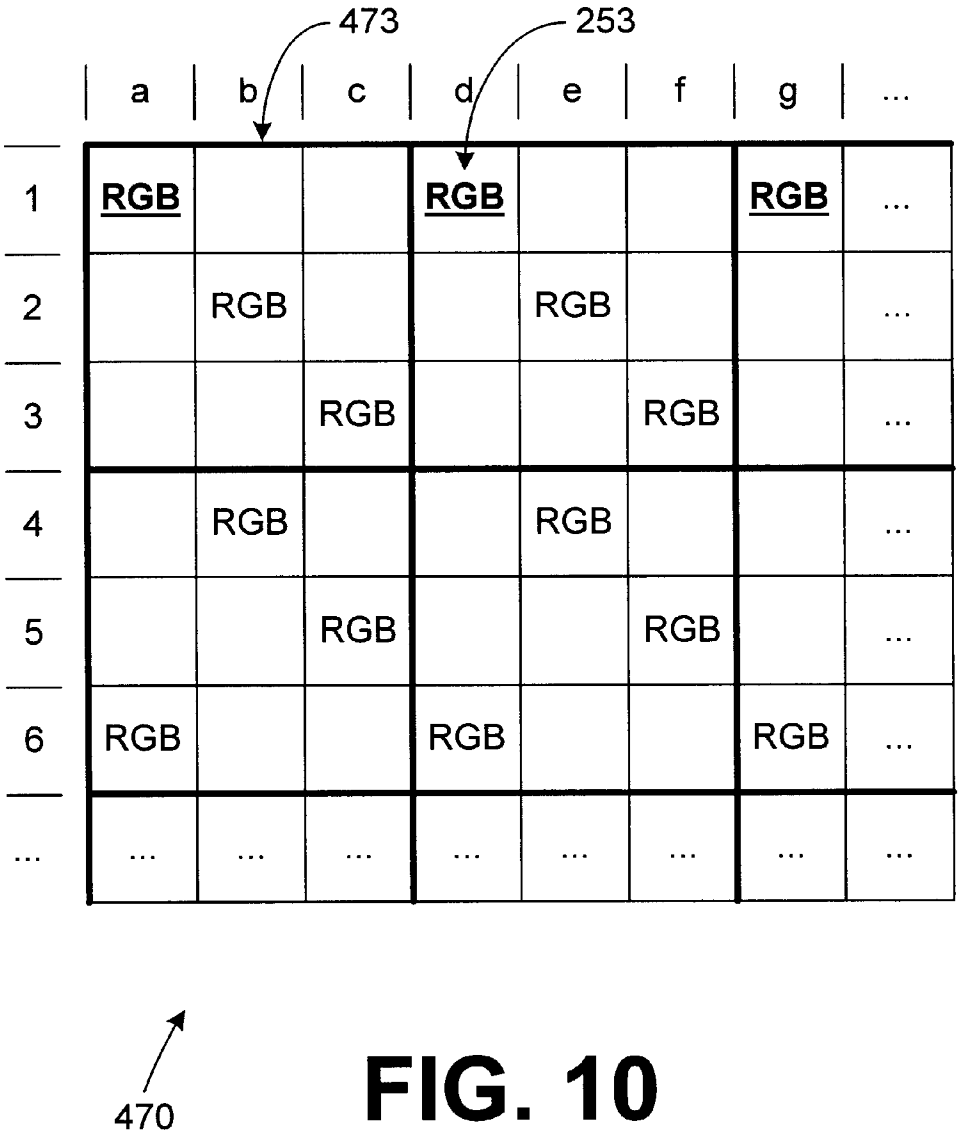
FIG. 10 is a drawing of a sampling pattern generated using an aligned CCD sensor with the second sensor interface circuit of FIG. 9.

With reference to FIG. 10, shown is a sampling pattern 470 that is obtained using first color acquisition sequence 459*a* in the timing and control logic 439 with an aligned CCD sensor 116*a*. As shown, there are a number of calculated pixels 473 that comprise a number of pixels 253 that are obtained from the sensors 219 of the aligned CCD sensor 116*a*. The sampling pattern 470 is divided into a number of rows that are numbered 1, 2, 3, 4, 5, 6, . . . , and a number of columns labeled a, b, c, d, e, f, g etc. Recall that the aligned CCD sensor 116*a* acquires the red, green and blue components of a single pixel 253 simultaneously. The fact that all three color components are acquired for a single pixel simultaneously eliminates the problem of color artifact as discussed before. As shown in FIG. 10, the first scan of the CCD sensor 116*a* according to the first color acquisition sequence 459*a* of the sampling pattern 470 is shown in which the red R, green G, and blue B components are noted in boldface and underlined. Thus, the scans of the various rows 1, 2, 3, 4, 5, 6, etc. of a particular document 123 are indicated by the first color acquisition sequence 459*a* that is as follows:

| | |
|---|---|
| First scan | R1a, G1a, B1a, R1d, G1d, B1d, R1g, . . . |
| Second scan | R2b, G2b, B2b, R2e, G2e, B2e, R2h, . . . |
| Third scan | R3c, G3c, B3c, R3f, G3f, B3f, R3i, . . . |
| Fourth scan | R4b, G4b, B4b, R4e, G4e, B4e, R4h, . . . |
| Fifth scan | R5c, G5c, B5c, R5f, G5f, B5f, R5i, . . . |
| Sixth scan | R6a, G6a, B6a, R6d, G6d, B6d, R6g, . . . |
| . . . | |

The color components R, G, and B of the pixels 253 that lie within each calculated pixel 473 are averaged over the entire calculated pixel 473 to obtain an image of lower resolution therefrom, as was discussed. The color component values obtained according to the color acquisition sequence 459*a* are stored in the memory 106 to generate an image therefrom. The location of the pixels 253 that contain color component information are known based on the color acquisition sequence 459*a* employed and the image comprising the calculated pixels 473 is generated therefrom.

With reference to FIG. 11, shown is a second sampling pattern 480 that is generated using a second color acquisition sequence 459*b* and employing a nonaligned CCD sensor 116*b*. A first scan of the nonaligned CCD sensor 116*b* results in the acquisition of color components R, G, and B indicated by underlining in the second sampling pattern 480. As noted by the underlined color components R, G, and B the red line 223R, green line 223G, and blue line 223B of the nonaligned CCD sensor 116*b*, there are three rows of pixels between the red, green, and blue lines 223*r*, 223*g*, and 223*b* (FIG. 9) of sensors 219. Consequently, pixels 253 that contain all three color components R, G, and B cannot be obtained until the ninth scan as shown. The calculated pixels 473 may be determined therefrom. Thus, to obtain the sampling pattern 480, the color acquisition sequence 459*b* is as follows:

| | |
|---|---|
| First scan | R1a, G5a, B9a, R1d, G5d, B9d, R1g, G5g, B9g . . . |
| Second scan | R2b, G6b, B10b, R2e, G6e, B10e, R2h, . . . |
| Third scan | R3c, G7c, B11c, R3f, G7f, B11f, R3i, . . . |
| Fourth scan | R4b, G8b, B12b, R4e, G8e, B12e, R4h, . . . |
| Fifth scan | R5a, G9a, B13a, R5d, G9d, B13d, R5g, G9g, . . . |
| Sixth scan | R6b, G10b, B14b, R6e, G10e, B14e, R6h, . . . |
| Seventh scan | R7c, G11c, B15c, R7f, G11f, B15f, R7i, . . . |
| Eighth scan | R8b, G12b, B16b, R8e, G12e, B16e, R8h, . . . |
| Ninth scan | R9a, G13a, B17a, R9d, G13d, B17d, R9g, . . . |
| Tenth scan | R10b, G14b, B18b, R10e, G14e, B18e, R10h, . . . |
| Eleventh scan | R11c, G15c, B19c, R11f, G14f, B18f, R11i, . . . |
| Twelfth scan | R12b, G16b, B20b, R12e, G14e, B18e, R12h, . . . |
| . . . | |

To obtain the calculated pixels 473, the above color acquisition sequence 459*b* is employed in a similar fashion as discussed before where the color acquisition sequence 459*b* indicates the particular location of the pixels 253 relative to each other in the document 123.

Turning to FIG. 12, shown is a third sampling pattern 490 obtained by employing a third color acquisition sequence 459*c* with the nonaligned CCD sensor 116*b*. The red line 223R, green line 223G and the blue line 223B are located on the nonaligned CCD sensor 116*b* in positions similar to that discussed with reference to FIG. 11. Also note that a first scan of the nonaligned CCD sensor 116*b* results in the acquisition of the underlined color components R, G, and B indicated in the scanning pattern 490. The color acquisition sequence 459*c* is randomized such that the pixels 253 may contain zero, one, two or three different color components as shown. The color acquisition sequence 459*c* is thus as follows:

| | |
|---|---|
| 1st scan | R1a, G5a, B9a, R1d, G5d, B9d, R1g, G5g, B9g . . . |
| 2nd scan | R2b, G6b, B10b, R2e, G6e, B10e, R2h, G6h, B10h . . . |
| 3rd scan | R3c, G7c, B11c, R3f, G7f, B11f, R3i, G7i, B11i . . . |
| 4th scan | R4a, G8a, B12a, R4d, G8d, B12d, R4g, G8g, B12g . . . |
| 5th scan | R5c, G9c, B13c, R5f, G9f, B13f, R5i, G9i, B13i . . . |
| 6th scan | R6b, G10b, B14b, R6e, G10e, B14e, R6h, G10h, B14h . . . |
| 7th scan | R7a, G11a, B15a, R7d, G11d, B15d, R7g, G11g, B15g . . . |
| 8th scan | R8b, G12b, B16b, R8e, G12e, B16e, R8h, G12h, B16h . . . |
| 9th scan | R9c, G13c, B17c, R9f, G13f, B17f, R9i, G13i, B17i . . . |

-continued

| | |
|---|---|
| 10th scan | R10a, G14a, B18a, R10d, G14d, B18d, R10g, G14g, B18g . . . |
| 11th scan | R11b, G15b, B19b, R11e, G15e, B19e, R11h, G15h, B19h . . . |
| 12th scan | R12c, G16c, B20c, R12f, G16f, B20f, R12i, G16i, B20i . . . |
| 13th scan | R13c, G17c, B21c, R13f, G17f, B21f, R13i, G17i, B21i . . . |
| 14th scan | R14a, G18a, B22a, R14d, G18d, B22d, R14g, G18g, B22g . . . |

Note that although some pixels 253 contain a single color component, others contain two color components, and still others contain three color components, the calculated pixels 473 can be obtained as quickly as the calculated pixels 473 from the color acquisition sequences 459*a* and 459*b* (FIGS. 11 and 12 ). In particular, this is because the number of color components contained within each calculated pixel 473 is still nine in similar fashion even though the acquisition of these components is more random. Due to the fact that the appearance of the color components R, G, and B in the sampling pattern 490 is random, the problem of color artifact as discussed with reference to FIGS. 3 and 4 is avoided. To generate the calculated pixels 473 and an image therefrom, the color acquisition sequence 459*c* must be retained in memory 106 so that the location of the particular color components that fall in the respective calculated pixels 473 are employed to in fact calculate the average color components of the calculated pixels 473.

Note that the color acquisition sequences 459*a–c* resulting in the respective sampling patterns 470 (FIG. 10), 480 (FIG. 11), and 490 (FIG. 12) advantageously allow the speed of the scan motion 136 (FIG. 1) to operate at three times the speed of conventional scanning systems 100 (FIG. 1) that store all three color components R, B, and G for each pixel 253 acquired from the document 123. This is achieved at an expense of resolution in that the images resulting therefrom are generated using the calculated pixels 473. However, this price is not too great considering the magnitude of the resolution of the image using the pixels 253. In fact, many display devices are not capable of achieving such magnitudes in the first place. In addition, the various color acquisition sequences discussed herein are merely examples of the multitude of different such sequences that may be employed to achieve the reduction of color artifact and faster scanning speeds as discussed above.

Figure 13:
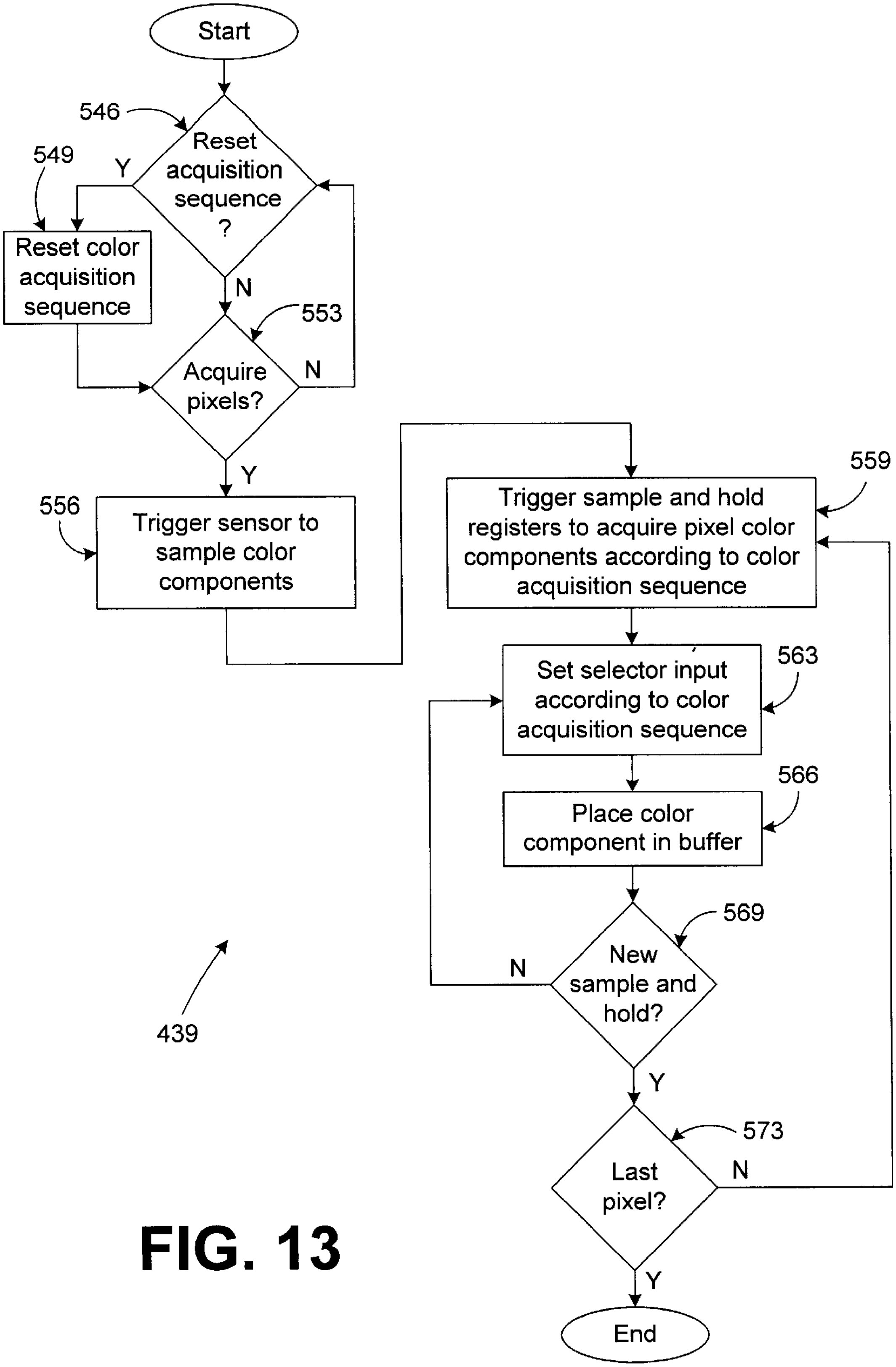
FIG. 13 is a flow chart of an exemplary color acquisition sequence employed in the second sensor interface circuit of FIG. 9.

Finally, reference is made to FIG. 13 that shows the timing and control logic 439 to obtain the particular pixel color components according to the color acquisition sequence 459 (FIG. 9). The timing and control logic 439 specifically controls the operation of the components of the sensor interface circuit 113*b* (FIG. 9) as well as the CCD sensor 116*a*/116*b*. Beginning with block 546, the timing and control logic 226 determines whether the color acquisition sequence 459 in the timing and control logic 439 needs to be reset to begin a scan of a document 123 (FIG. 1). Generally, this involves determining whether the reset signal 465 (FIG. 9) has been received from the processor 103 pursuant to the scanning logic 133. If the color acquisition sequence 459 is to be reset, then the logic 439 moves to block 549 in which the color acquisition sequence 459 is placed in a beginning state. If, in block 546, the color acquisition sequence 459 is not to be reset because no reset signal 465 is applied to the timing and control logic 439, then the logic 439 moves on to block 553 in which it is determined whether the pixels are to be acquired in a scan with the CCD sensor 116*a*/116*b*. If so, then the logic 439 progresses to block 556. Otherwise, the logic 439 reverts back to block 546.

In block 556 in which the CCD sensor 116*a*/116*b* is triggered to sample the pixel color components by applying the trigger signal 446 (FIG. 9) thereto. Thereafter, in block 559, the sample signal 449 (FIG. 9) is applied to the registers 403, 406, and 409 to acquire the pixel color components R, G, and B according to the particular color acquisition sequence 459. Thereafter, in block 563, the selector input 456 to the multiplexer 423 is set according to the color acquisition sequence 459. Then, in block 566, the color component from the register 403, 406 or 409 that is currently fed through the multiplexer based upon the selector input 456 is provided to the buffer 429.

Then, in block 569, the timing and control logic 439 determines whether to apply the sample signal 449 to the registers 403, 406, and 409 to acquire new pixel color components R, G, and B according to the particular color acquisition sequence 459 that may acquire more than a single color component per pixel. If the new pixel color components are not to be acquired in block 569, then the timing and control logic 439 reverts back to block 563 to supply one of the remaining values held in one lo of the registers 403, 406, or 409 to the buffer 429.

If in block 569 the registers 403, 406, and 409 are to be triggered to acquire another set of pixel color components according to the color acquisition sequence 459, then the timing and control logic 439 progresses to block 573. In block 573, it is determined whether the color components of the last pixel in a single scan of the CCD sensor 116*a*/116*b* have been acquired. If the last pixel color components have not been acquired, then the timing and control logic 439 reverts back to block 559 where the sample signal 449 is applied to the registers 403, 406, and 409 as determined by the color acquisition sequence 459. Otherwise, if in block 573 the last pixel color components have been acquired, the timing and control logic 439 ends accordingly.

In addition, the scanning logic 133 and the timing and control logic 226 and 439 of the present invention can be implemented in hardware, software, firmware, or a combination thereof. In the preferred embodiment(s), the logic 133, 226, and 439 is implemented in software or firmware that is stored in a memory and that is executed by a suitable instruction execution system. If implemented in hardware, as in an alternative embodiment, the logic 133, 226, and 439 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 7, 8, and 13 show the architecture, functionality, and operation of a possible implementation of the logic 133, 226, and 439. In this regard, each block represents a module, segment, or portion of code, which comprises one or more executable instructions for implementing the specified logical function(s). It should also be noted that in some alternative implementations, the functions noted in the blocks may occur out of the order noted in FIGS. 7, 8, and 13. For example, two blocks shown in succession in FIGS. 7, 8, and 13 may in fact be executed substantially concurrently or the blocks may sometimes be executed in the reverse order, depending upon the functionality involved.

Finally, the logic 133, 226, and 439, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. An interface circuit to control an acquisition of a number of pixels in a scanning system, the interface circuit comprising:

a multiplexer to route at least one color component of one of a number of pixels to a register, the multiplexer having at least three color component inputs to receive at least three color components for each of the pixels;

logic to control a selection signal applied to the multiplexer and a sample signal applied to the register to acquire the at least one color component according to a color acquisition sequence, the color acquisition sequence causing an acquisition of a number of color components associated with an image that is less than a total number of color components of the image; and logic to generate a number of calculated pixels from the acquired ones of the color components, the calculated pixels having a resolution that is less than a resolution of the image, each of the calculated pixels including a number of averaged color components.

2. The interface circuit of claim 1, wherein:

each of the pixels includes a total of three of the color components; and the color acquisition sequence causes less than three of the color components to be acquired per pixel, the color components being acquired in a random sampling pattern to substantially reduce an occurrence of color artifact in the image.

3. An interface circuit to control an acquisition of a number of pixels in a scanning system, the interface circuit comprising:

at least three registers, each register having an input to receive a color component associated with one of a number of pixels from a charged coupled device (CCD) sensor, wherein each of the registers includes a sample signal input;

a miultiplexer having a number of inputs, the color component from each of the at least three registers being applied to one of the inputs, the multiplexer having a selection input; and logic to generate a selection signal applied to the selection input and a sample signal applied to the sample signal input, the selection signal and the sample signal being generated according to a color acquisition sequence, the color acquisition sequence causing an acquisition of a number of color components of an image that is less than a total number of color components of the image; and logic to generate a number of calculated pixels from the acguired ones of the color components, the calculated pixels having a resolution that is less than a resolution of the image, each of the calculated pixels including a number of averaged color components.

4. The interface circuit of claim 3, wherein:

each of the pixels includes a total of three of the color components; and the color acquisition sequence causes less than three of the color components to be acquired per pixel, the color components being acquired in a random sampling pattern to substantially reduce an occurrence of color artifact in the image.

5. A method for acquiring of a number of pixels in a scanning system, the method comprising the steps of:

generating a number of color components associated with a number of pixels of an image;

acquiring at least one of the color components associated with a number of the pixels, the acquisition being made according to a color acquisition sequence that causes an acquisition of a number of color components of an image that is less than a total number of color components of the image; and storing the at least one of the color components selected in a memory; and generating a number of calculated pixels from the acquired ones of the color components, the calculated pixels having a resolution that is less than a resolution of the image, each of the calculated pixels including a number of averaged color components.

6. The method of claim 5, wherein the step of acquiring at least one of the color components associated with a number of the pixels further comprises the step of acquiring less than a total number of color components from each of the pixels, thereby creating a random sampling pattern to substantially reduce an occurrence of color artifact in the image.

7. A method for acquiring a number of color components associated with a number of pixels of an image in a scanning system, comprising the steps of:

generating the number of color components associated with the number of pixels of the image;

simultaneously acquiring all of the color components for each of the pixels;

selecting at least one of the color components acquired simultaneously for a number of the pixels;

storing the color components selected in a memory, wherein a total number of color components selected is less than a total number of color components associated with the image; and generating a number of calculated pixels from the selected ones of the color components, the calculated pixels having a resolution that is less than a resolution of the image, each of the calculated pixels including a number of averaged color components.

8. The method of claim 7, wherein the step of selecting at least one of the color components acquired simultaneously for a number of the pixels further comprises the step of selecting less than all of the color components associated with each of the pixels according to a random pattern to substantially reduce an occurrence of color artifact in the image.

9. An interface circuit to control an acquisition of a number of pixels in a scanning system, the interface circuit comprising:

a multiplexer to route at least one color component of one of a number of pixels to a register, the multiplexer having at least three color component inputs to receive at least three color components for each of the pixels;

logic to control a selection signal applied to the multiplexer and a sample signal applied to the register to acquire the at least one color component according to a color acquisition sequence, the color acquisition sequence causing an acquisition of a number of color components associated with an image that is less than a total number of color components of the image;

wherein each of the pixels includes a total of three of the color components; and the color acquisition sequence causes a random number of the color components to be acquired per pixel, the color components being acquired in a random sampling pattern to substantially reduce an occurrence of color artifact in the image.

10. An interface circuit to control an acquisition of a number of pixels in a scanning system, the interface circuit comprising:

a multiplexer to route at least one color component of one of a number of pixels to a register, the multiplexer having at least three color component inputs to receive at least three color components for each of the pixels;

logic to control a selection signal applied to the multiplexer and a sample signal applied to the register to acquire the at least one color component according to a color acquisition sequence, the color acquisition sequence causing an acquisition of a number of color components associated with an image that is less than a total number of color components of the image;

wherein each of the pixels includes a total of three of the color components; and the color acquisition sequence causes the three of the color components associated with a respective pixel to be acquired, wherein the color components are acquired for a number of the pixels that is less than a total number of the pixels in the image.

11. The interface circuit of claim 10, wherein the color acquisition sequence further causes the three of the color components associated with a respective pixel to be acquired for the number of the pixels in a random pattern.

12. An interface circuit to control an acquisition of a number of pixels in a scanning system, the interface circuit comprising:

at least three registers, each register having an input to receive a color component associated with one of a number of pixels from a charged coupled device (CCD) sensor, wherein each of the registers includes a sample signal input;

a multiplexer having a number of inputs, the color component from each of the at least three registers being applied to one of the inputs, the multiplexer having a selection input;

logic to generate a selection signal applied to the selection input and a sample signal applied to the sample signal input, the selection signal and the sample signal being generated according to a color acquisition sequence, the color acquisition sequence causing an acquisition of a number of color components of an image that is less than a total number of color components of the image;

wherein each of the pixels includes a total of three of the color components; and the color acquisition sequence causes a random number of the color components to be acquired per pixel, the color components being acquired in a random sampling pattern to substantially reduce an occurrence of color artifact in the image.

13. An interface circuit to control an acquisition of a number of pixels in a scanning system, the interface circuit comprising:

at least three registers, each register having an input to receive a color component associated with one of a number of pixels from a charged coupled device (CCD) sensor, wherein each of the registers includes a sample signal input;

a multiplexer having a number of inputs, the color component from each of the at least three registers being applied to one of the inputs, the multiplexer having a selection input;

logic to generate a selection signal applied to the selection input and a sample signal applied to the sample signal input, the selection signal and the sample signal being generated according to a color acquisition sequence, the color acquisition sequence causing an acquisition of a number of color components of an image that is less than a total number of color components of the image;

wherein each of the pixels includes a total of three of the color components; and the color acquisition sequence causes the three of the color components associated with a respective pixel to be acquired, wherein the color components are acquired for a number of pixels that is less than a total number of pixels in the image.

14. A method for acquiring of a number of pixels in a scanning system, the method comprising the steps of:

generating a number of color components associated with a number of pixels of an image;

acquiring at least one of the color components associated with a number of the pixels by selecting a random number of the color components from each of the pixels, the acquisition being made according to a color acquisition sequence that causes an acquisition of a number of color components of an image that is less than a total number of color components of the image, thereby creating a random sampling pattern to substantially reduce an occurrence of color artifact in the image; and storing the at least one of the color components selected in a memory.

15. A method for acquiring of a number of pixels in a scanning system, the method comprising the steps of:

generating a number of color components associated with a number of pixels of an image;

acquiring all of the color components associated with a number of the pixels, the acquisition being made according to a color acquisition sequence that causes an acquisition of a number of color components of an image that is less than a total number of color components of the image; and storing the at least one of the color components selected in a memory.

16. The method of claim 15, wherein the step of acquiring all of the color components associated with the number of the pixels further comprises the step of acquiring all of the color components associated with a respective ones of the pixels in a random pattern of pixels.

17. A method for acquiring a number of color components associated with a number of pixels of an image in a scanning system, comprising the steps of:

generating the number of color components associated with the number of pixels of the image;

simultaneously acquiring all of the color components for each of the pixels;

selecting a random number of the color components acquired for each of the pixels according to a random pattern to substantially reduce an occurrence of color artifact in the image; and storing the color components selected in a memory, wherein a total number of color components selected is less than a total number of color components associated with the image.

18. A method for acquiring a number of color components associated with a number of pixels of an image in a scanning system, comprising the steps of:

generating the number of color components associated with the number of pixels of the image;

simultaneously acquiring all of the color components for each of the pixels;

selecting all of the color components associated with a select number of the pixels that is less than a total number of the pixels in the image; and storing the selected ones of the color components in a memory, wherein a total number of color components selected is less than a total number of color components associated with the image.

19. The method of claim 18, wherein the step of selecting all of the color components associated with a select number of the pixels that is less than a total number of the pixels in the image further comprises the step of selecting the color components associated with the select number of the pixels in a random pattern.

* * * * *